Patented Feb. 12, 1946

2,394,587

UNITED STATES PATENT OFFICE 2,394,587

PREPARATION OF N-SUBSTITUTED AMINOPHENOLS

Frederic R. Bean, Rochester, N. Y., assignor to Eastman Kodak Company, Rochester, N. Y., a corporation of New Jersey No Drawing. Application July 22, 1942, Serial No. 451,894

7 Claims. (Cl. 204—74)

This invention relates to a process for preparing N-substituted aminophenols of the type of N-aralkylaminophenols.

N-aralkylaminophenols, such as N-benzyl-p-aminophenol, and N - furfuryl - p - aminophenol, have been prepared by the alkali-zinc dust or the alkali-aluminium reduction of N-benzylidene-p-aminophenol and N-furfurylidene-p-aminophenol. N-benzyl-p-aminophenol has also been prepared by reducing N-benzylidene-p-aminophenol electrolytically, using an aqueous alcoholic solution of sodium acetate as a combined electrolyte and solvent—the water and sodium acetate serving as the electrolyte and the alcohol as the solvent for the N-benzylidene-p-aminophenol. A lead cathode was employed. This electrolytic method requires a fairly high temperature (about 80° C.) for its successful operation. At such temperatures, under the alkaline conditions imposed by the sodium acetate electrolyte, the N-benzyl-p-aminophenol which is formed is contaminated with decomposition products. Moreover, in order to isolate the N-benzyl-p-aminophenol, it is necessary to remove the alcohol, and for practical operation the alcohol should be recovered.

I have now found that N-aralkylidene aminophenols can be reduced electrolytically to N-aralkylaminophenols, using aqueous alkali as the combined electrolyte and solvent. Especially when a dilute alkali solution (e. g. about 1 percent NaOH) is used, the reduction proceeds at a lower temperature and at a lower average potential than when aqueous alcoholic sodium acetate is used as the electrolyte, with the result that the N-aralkyl-aminophenols are obtained relatively free from decomposition products. N-alkylaminophenols cannot be made by my new process.

It is accordingly an object of my invention to provide an improved process for preparing N-aralkylaminophenols. Other objects will become apparent hereinafter.

In accordance with the invention, N-aralkylidene aminophenols, e. g. N-benzylidene-p-aminophenol, and N-furfurylidene-p-aminophenol, are reduced electrolytically, using an aqueous solution of an alkali metal hydroxide as the electrolyte. Advantageously, a dilute aqueous solution of sodium hydroxide is employed. When the concentration of the alkali is low, i. e. of the order of 1 percent, the reduction proceeds at relatively low temperatures and relatively low average potentials, thereby considerably minimizing any deterioration of the N-aralkylideneaminophenols or the N-aralkylaminophenols which are formed.

The following examples will serve to illustrate the manner of practicing the invention.

*Example 1.—N-furfuryl-p-aminophenol*

18.6 g. of N-furfurylidene-p-aminophenol were dissolved in 400 cc. of an aqueous solution of sodium hydroxide containing 1 percent by weight of sodium hydroxide. The resulting solution was placed in the cathode compartment of an electrolytic cell. The cathode was composed of a cylindrical zinc sheet and separated from the anode by means of a porous diaphragm. The anode consisted of a cylindrical sheet of nickel. The anolyte was also a 1 percent aqueous sodium hydroxide solution. The reduction was then run at 25° C. at a current density of 0.01 ampere per square centimeter at a potential of 5 volts. The reduction proceeded smoothly and a faintly yellowed or straw-colored solution was obtained after completion of the reduction (which was evident from the hydrogen which began to evolve from the solution). N-furfuryl-p-aminophenol was precipitated as a white solid when sodium bisulfite was added to the yellowish solution. It was filtered off and then washed with water and dried. It melted at 110° to 111° C. Its nitroso derivative melted at 95° to 98° C.

*Example 2.—N-benzyl-p-aminophenol*

5 g. of N-benzylidene-p-aminophenol were dissolved in 400 cc. of an aqueous solution of sodium hydroxide containing 1 percent by weight of sodium hydroxide. The resulting solution was placed in the cathode compartment of an electrolytic cell. The cathode was composed of a cylindrical zinc sheet and separated from the anode by a Coors porous clay diaphragm. The anode consisted of a cylindrical sheet of nickel. The anolyte consisted of an aqueous solution containing 1 percent by weight of sodium hydroxide and 10 percent by weight of sodium sulfate. The reduction was then run at 25° C. at a current density of between 0.0033 and 0.0066 amperes per square centimeter at a potential of from 3.2 to 3.7 volts. At the end of two hours, the catholyte was acidified with hydrochloric acid and char-filtered hot. Upon cooling white crystals of N-benzyl-p-aminophenol hydrochloride separated out. The crystals melted at 171° to 172° C. The crystals were dissolved in water and treated with sodium bicarbonate, whereupon N-benzyl-p-aminophenol separated out. It melted at 88° to 89° C. The sodium sulfate was employed in the anolyte above to retard "pumping" of the anolyte into the catholyte. The reduction is also advantageously begun with catholyte liquid at a higher level than the anolyte liquid, in order to overcome "pumping."

In a manner similar to that illustrated in the foregoing examples, N-(4-methylbenzylidene)-p-aminophenol, N-(4-methoxybenzyl)-p-aminophenol, and other N-aralkylidene aminophenols can be reduced.

What I claim as my invention and desire to be secured by Letters Patent of the United States is:

1. In a process for electrolytically reducing a compound selected from the group consisting of N-aralkylidene-p-aminophenols and N-furfurylidene-p-aminophenol to produce N-aralkyl-p-aminophenols and N-furfuryl-p-aminophenol in a diaphragm-containing electrolytic cell, the improvement which comprises employing a temperature of not more than about 25° C., a zinc cathode and a catholyte comprising essentially a water solution of an alkali metal hydroxide containing about one percent by weight of the alkali metal hydroxide and a compound selected from the group consisting of a N-aralkylidene-p-aminophenol and N-furfurylidene-p-aminophenol.

2. In a process for electrolytically reducing a N-aralkylidene-p-aminophenol to produce a N-aralkyl-p-aminophenol in a diaphragm-containing electrolytic cell, the improvement which comprises employing a temperature of not more than about 25° C., a zinc cathode and a catholyte comprising essentially a water solution of an alkali metal hydroxide containing about one percent by weight of the alkali metal hydroxide and a N-aralkylidene-p-aminophenol.

3. In a process for electrolytically reducing a N-aralkylidene-p-aminophenol to produce a N-aralkyl-p-aminophenol in a diaphragm-containing electrolytic cell, the improvement which comprises employing a temperature of not more than about 25° C., a zinc cathode and a catholyte comprising essentially a water solution of sodium hydroxide containing about one percent by weight of sodium hydroxide and a N-aralkylidene-p-aminophenol.

4. In a process for electrolytically reducing N-benzylidene-p-aminophenol to N-benzyl-p-aminophenol in a diaphragm-containing electrolytic cell, the improvement which comprises employing a temperature of not more than about 25° C., a zinc cathode and a catholyte comprising a water solution of an alkali metal hydroxide containing about one percent by weight of the alkali metal hydroxide and N-benzylidene-p-aminophenol.

5. In a process for electrolytically reducing N-benzylidene-p-aminophenol to N-benzyl-p-aminophenol in a diaphragm-containing electrolytic cell, the improvement which comprises employing a temperature of not more than about 25° C., a zinc cathode and a catholyte comprising a water solution of sodium hydroxide containing about one percent by weight of sodium hydroxide and N-benzylidene-p-aminophenol.

6. In a process for electrolytically reducing N-furfurylidene-p-aminophenol to N-furfuryl-p-aminophenol in a diaphragm-containing electrolytic cell, the improvement which comprises employing a temperature of not more than about 25° C., a zinc cathode and a catholyte comprising a water solution of an alkali metal hydroxide containing about one percent by weight of the alkali metal hydroxide and N-furfurylidene-p-aminophenol.

7. In a process for electrolytically reducing N-furfurylidene-p-aminophenol to N-furfuryl-p-aminophenol in a diaphragm containing electrolytic cell, the improvement which comprises employing a temperature of not more than about 25° C., a zinc cathode and a catholyte comprising a water solution of sodium hydroxide containing about one percent by weight of the alkali metal hydroxide and N-furfurylidene-p-aminophenol.

FREDERIC R. BEAN.